United States Patent [19]
Sahnazarian

[11] Patent Number: 5,457,928
[45] Date of Patent: Oct. 17, 1995

[54] SLOPE AND SKEW HANGER CONNECTORS

[75] Inventor: George Sahnazarian, North Burnaby, Canada

[73] Assignee: MGA Construction Hardware and Steel Fabricating Ltd., Maple Ridge, Canada

[21] Appl. No.: 221,505

[22] Filed: Apr. 1, 1994

[51] Int. Cl.⁶ ................................. E04B 1/38; F16B 9/00
[52] U.S. Cl. .................. 52/702; 52/696; 52/712; 52/634; 403/232.1; 403/403
[58] Field of Search .......................... 52/702, 703, 695, 52/693, 643, 712, 633; 403/231.1, 401, 402, 403, 405, 174

[56] References Cited

U.S. PATENT DOCUMENTS

| 1,146,251 | 7/1915 | Harp | 52/702 X |
| 4,230,416 | 10/1980 | Gilb | 403/232.1 |
| 4,261,155 | 4/1981 | Gilb | 52/702 |
| 4,291,996 | 9/1981 | Gilb | 403/14 |
| 4,423,977 | 1/1984 | Gilb | 403/232.1 |
| 4,480,941 | 11/1984 | Gilb et al. | 403/232.1 |
| 4,560,301 | 12/1985 | Gilb | 52/702 X |
| 4,572,695 | 2/1986 | Gilb | 52/702 X |
| 4,897,979 | 2/1990 | Colonias | 52/702 X |
| 5,004,369 | 4/1991 | Young | 403/232.1 |
| 5,071,280 | 12/1991 | Turner | 52/702 X |

Primary Examiner—Carl D. Friedman
Assistant Examiner—Winnie S. Yip
Attorney, Agent, or Firm—Long and Cameron

[57] ABSTRACT

A sheet metal slope and skew hanger connector has first and second side support members located at opposite sides of a backplate and being bendable relative to the backplate. Each of the side support members is formed with a pair of parallel ribs extending along a marginal edge portion thereof and with nail holes in each of the ribs to facilitate nailing of the connector to a first wood member, the nail holes extending through the connector at laterally outermost sides of the ribs. The connector includes a seat base extending from a bottom portion of the backplate for supportingly engaging an underside of a second wood member, with a pair of seat sides extending from opposite sides of the seat base, and a pair of tab members spaced apart from one another with a portion of the backplate therebetween, with nail holes in the tab members to facilitate nailing of the tab members to the opposite side faces of the second wood member.

6 Claims, 5 Drawing Sheets

SLOPE AND SKEW HANGER CONNECTORS

BACKGROUND OF THE INVENTION

1. Field of the Invention

The present invention relates to sheet metal slope and skew hanger connectors for attachment to a side face of a first wood member, for example a supporting beam, so as to support a second wood member, for example a rafter, from the first wood member, with the second wood member sloping and being skewed relative to the first wood member.

2. Description of the Related Art

It has previously been proposed to provide a slope and skew hanger connector in the form of a backplate between a pair of side supporting members, which are nailed to one face of the first wood member, the connector also having a pair of tab members and a seat for attachment to the second wood member.

More particularly, the tab members are bent relative to the backplate so as to receive an end of the second wood member therebetween, and are nailed to opposite sides of the end of the wood member when the connector is in use. Also, the seat comprises a seat base which is bent relative to the bottom of the backplate, so as to underlie the end of the second wood member, and a pair of seat sides extending upwardly from the seat base and being nailed to the opposite sides of the second wood member.

Examples of such slope and skew hanger connectors are disclosed in U.S. Pat. No. 4,423,977, issued Jan. 3, 1984 to Tyrell T. Gilb, and U.S. Pat. No. 5,004,369, issued Apr. 2, 1991 to Daniel E. Young.

BRIEF SUMMARY OF THE INVENTION

It is an object of the present invention to provide a novel and improved slope and skew hanger connector having means for strengthening the side support members and improving the attachment of the side support members to the first wood member.

According to the present invention, there is provided a sheet metal slope and skew hanger connector which has first and second side support members at opposite sides of a backplate, the first and second side support members being bendable relative to the backplate.

Each of the side support members is formed with a pair of parallel ribs extending along a marginal edge portion thereof and with a plurality of holes in each of said ribs to facilitate nailing of the connector to a first wood member. The nail holes extend through the connector at laterally outermost sides of the ribs.

A seat base extending from the bottom portion of the backplate is bendable relative to the backplate along the bottom portion for supportingly engaging an underside of a second wood member, the seat base being provided with a pair of seat sides extending from opposite sides of the seat base and bendable along the opposite sides of the seat base, with nail holes in the seat sides to facilitate nailing of the seat sides to opposite side faces of the second wood member.

A pair of tab members are spaced apart from one another with a portion of the backplate therebetween, the tab members being bendable relative to the backplate and nail holes being provided in the tab members to facilitate nailing of the tab members to the opposite side faces of the second wood member.

The provision of the pairs of parallel ribs extending along the marginal edge portions of the side support members provides the advantage of substantially strengthening the side support members at the locations where the side support members are nailed to the first wood member and, in use, are subjected to loading from the weight of the second wood member and any other object supported by the second wood member.

In the preferred embodiment of the invention, the nail holes and the ribs are each dimensioned to receive the nail at an angle which is selectively variable to facilitate attachment of the respective side support member to the first wood member fit a selectively variable angle relative to the backplate. Consequently, the side support members can be bent at any desired angle relative to the backplate, depending upon the skewing of the second wood member relative to the first wood member, and the nails can then be inserted through the nail holes in the ribs at angles which can be selected so as to provide the most secure attachment of the hanger connector to the first wood member.

Also, the pairs of ribs preferably each comprise a laterally outermost first rib and a laterally innermost second rib, the second rib being larger than the first rib to facilitate insertion of nails into the nail holes in the second rib without obstruction by the first rib.

BRIEF DESCRIPTION OF THE DRAWINGS

The objects, features and advantages of the present invention will be more readily understood by those skilled in the art by reference to the following description thereof when taken in conjunction with the accompanying drawings, in which.

DESCRIPTION OF THE PREFERRED EMBODIMENT

Figure 1:
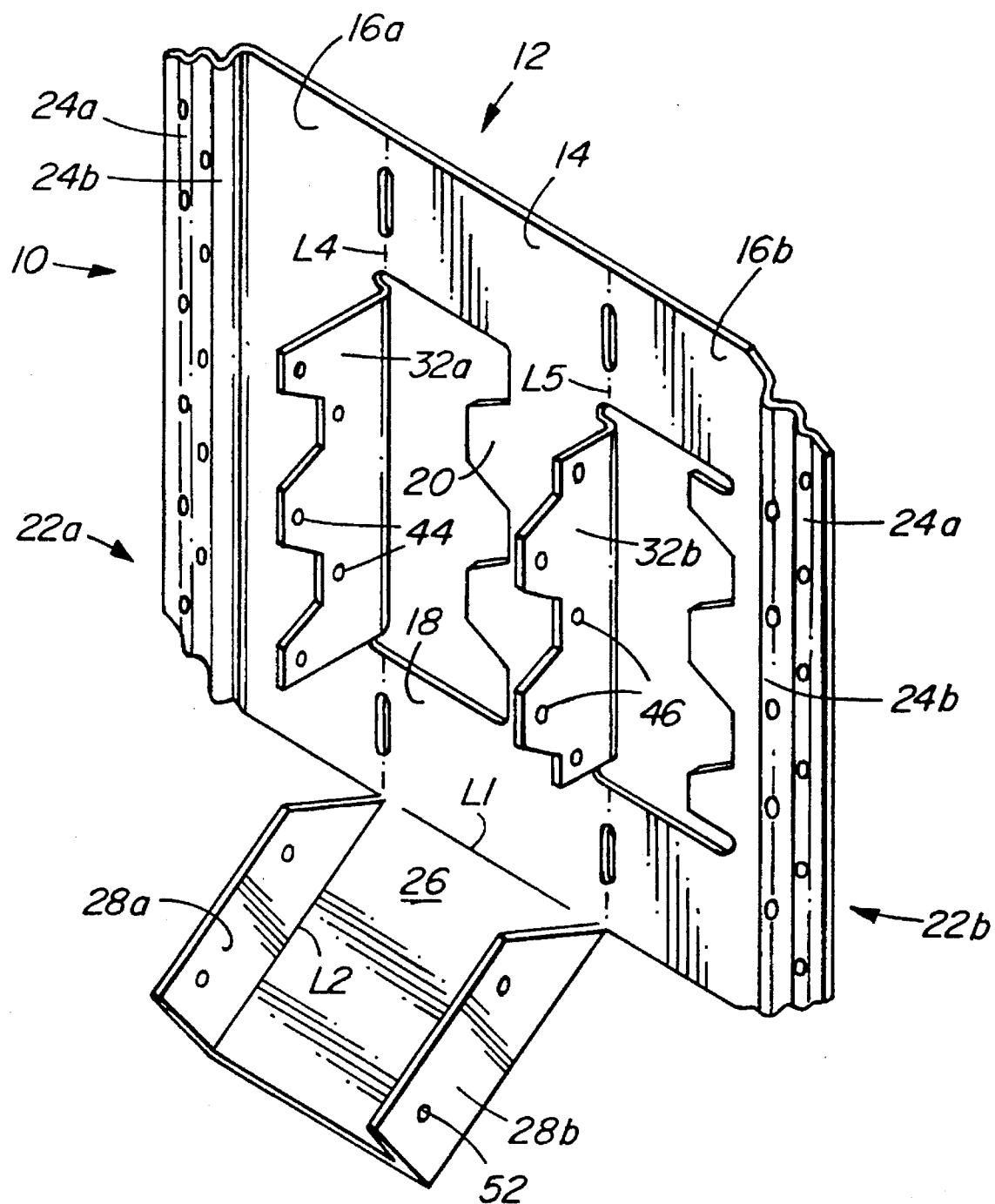
FIG. 1 shows a view in perspective of a sheet metal slope and skew hanger connector according to the present invention.

In FIG. 1 of the accompanying drawings, a one-piece sheet metal slope and skew hanger connector according to the present invention is indicated generally by reference numeral 10.

The hanger connector 10 has a backplate which is indicated generally by reference numeral 12, and the backplate 12 comprises a backplate top 14, which connects the upper portions of a first side support member 16a and a second side support member 16b; a backplate bottom portion 18, which connects bottom portions of the first and second side support member 16a and 16b, and a backplate intermediate portion 20, which connects the backplate top and bottom portions 14 and 18.

The first and second side support members 16a and 16b are provided with laterally outermost marginal edge portions, which are indicated generally by reference numerals 22a and 22b. The marginal edge portions 22a and 22b are each formed with a first, laterally outermost rib 24a and a second, laterally innermost rib 24b. The ribs 24a and 24b extend parallel to one another along the entire lengths of the marginal edge portions 22a and 22b along the opposite sides of the connector 10.

A rectangular seat base 26 extends downwardly from the backplate bottom portion 18, and is bendable relative to, the backplate bottom portion 18 along a bend line L1, the seat base 26 being provided, at opposite sides of the seat base 26, with seat sides 28a and 28b, which are bendable relative to the seat base 26 along bend lines L2 and L3, respectively.

Figure 3:
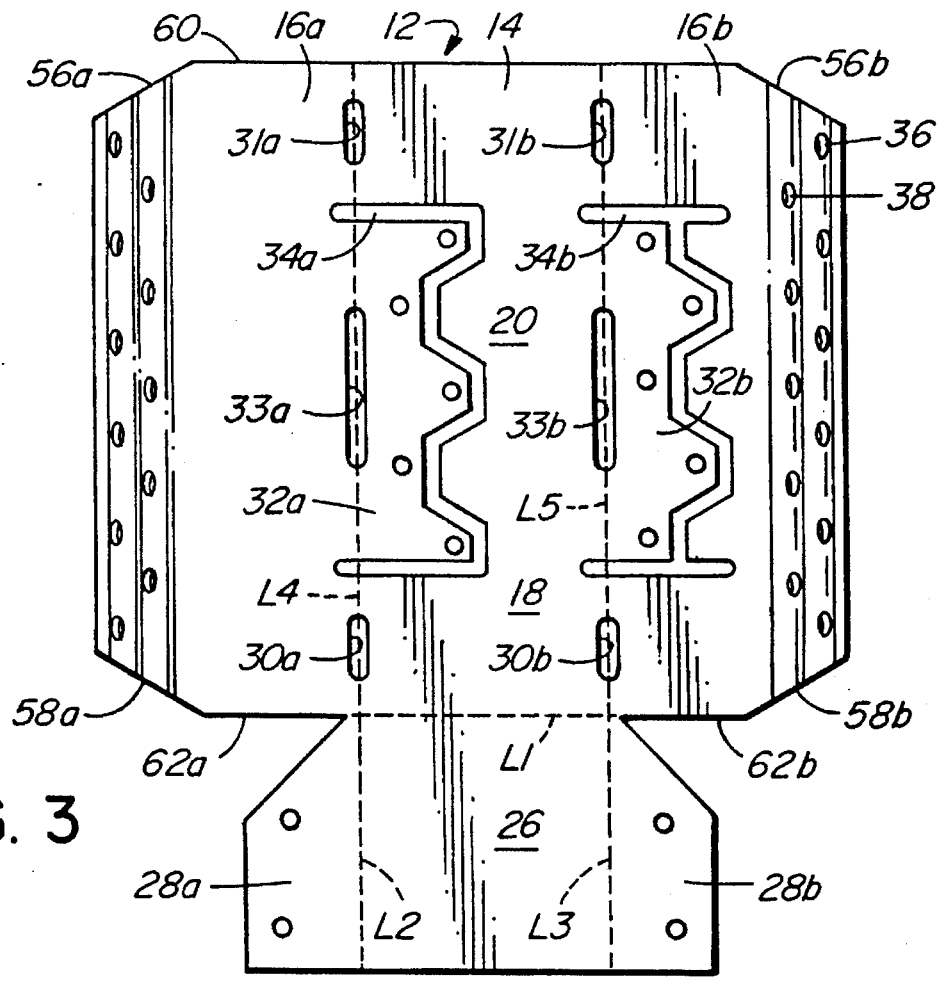
FIG. 3 shows a view in front elevation of a blank of the hanger of FIGS. 1 and 2.

The first side support member 16a is bendable relative to the backplate upper and bottom portions 14 and 18 along a bend line L4, and this bending of the first side support member 16a is facilitated by the provision of slots 30a and 31a, which are aligned with one another along the bend line L4, as shown in FIG. 3, The second side support member 16b is bendable relative to the backplate top and bottom portions 14 and 18 along a bend line L5, and this bending is facilitated by the provision of slots 30b and 31b, which are arranged in alignment with one another along the bend line L4.

As can be seen from FIG. 3, the slots 30a, 30b and 31a, 31b are formed between the backplate 12 and the first and second side support member 16a, 16b, respectively. The connector 10 also has a pair of tab members 32a and 32b. The tab member 32a is formed by a slot 34a (FIG. 3) in the metal of the connector between the backplate top and bottom portions 14 and 18 in such a way that the tab member 32a is connected, at one side of the backplate 12, to the first side support member 16a along the bend line L4. As can be seen from FIG. 1, the tab member 32a is bendable relative to the backplate 10 and the first side support member 16a along the bend line L4 and a slot 33a is formed on the bend line L4 between the tab member 32a and the side support member 16a to facilitate this bending.

The tab member 32b is formed by a slot 34b (FIG. 3) in the second side support member 16b, and is connected to the backplate intermediate portion 20 along the bend line L5, on which a slot 33b is formed. The tab member 32b is bendable relative to the backplate 10 and the second side support member 16b along the bend line L5, as shown in FIG. 1.

Thus, the tab members 32a and 32b can be bent so as to extend at right angles to the plane of the backplate 12, as shown in FIG. 1.

Nail holes 36, extending through the thickness of the sheet metal of the connector 10, are formed in the first ribs 24 and are spaced apart from one another along the first ribs 24a, and nail holes 38, which likewise extend through the thickness of the sheet metal of the connector 10, are formed in the second ribs 24b and are spaced apart along the second ribs 24b.

Figure 2:
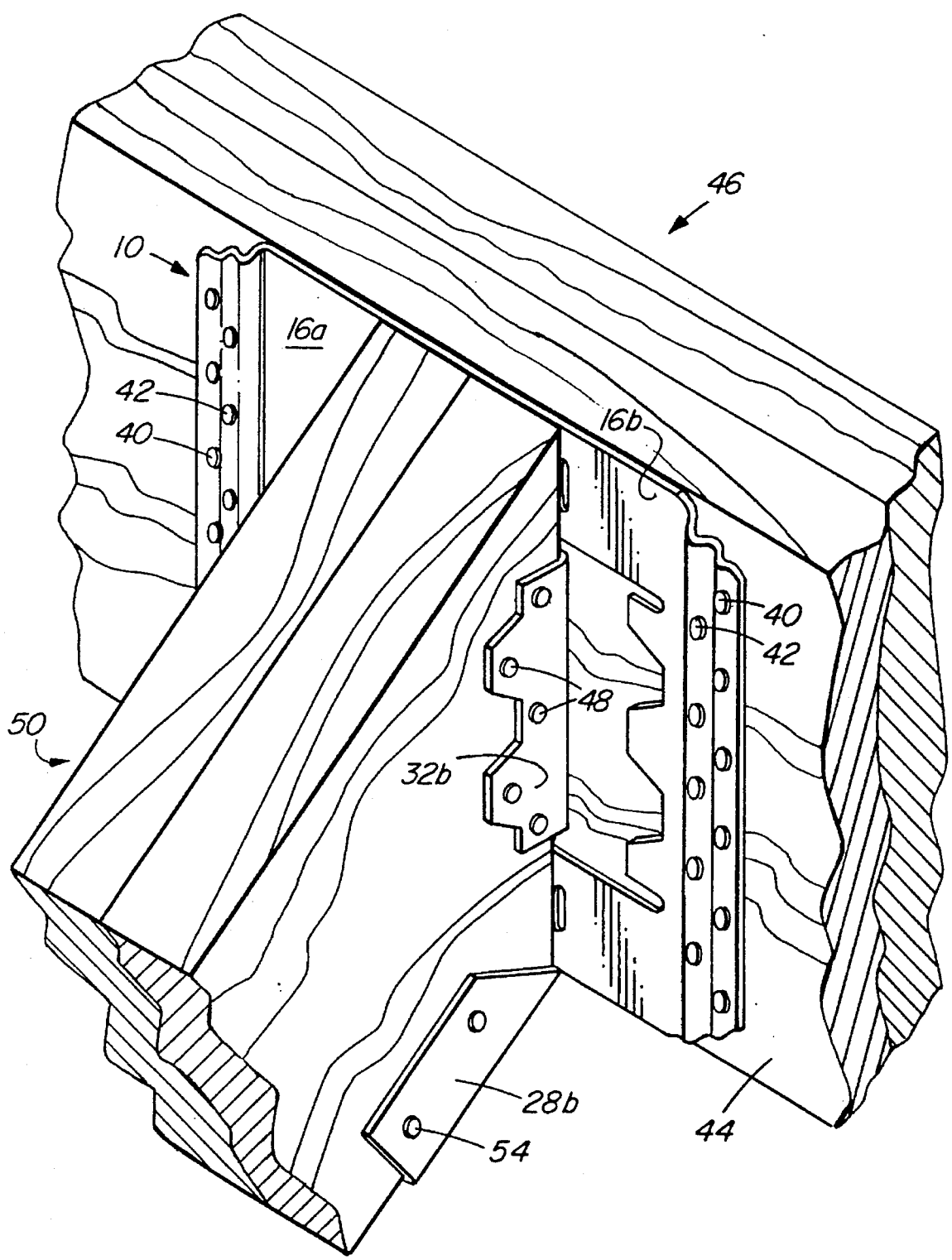
FIG. 2 shows a view in perspective of the hanger of FIG. 1 nailed to a pair of wood members.

When the hanger connector 10 is in use, as illustrated in FIG. 2, nails 40 and 42 are driven through the nail holes 36 and 38, respectively, into a side face 44 of a first wood member, which is indicated generally by reference numeral 46 and which may, for example, comprise a composite wood beam. The nail holes 38 are vertically offset from the nail holes 36, as viewed in FIGS. 2 and 3, so as to counteract splitting of the first wood member 46.

Figure 5:
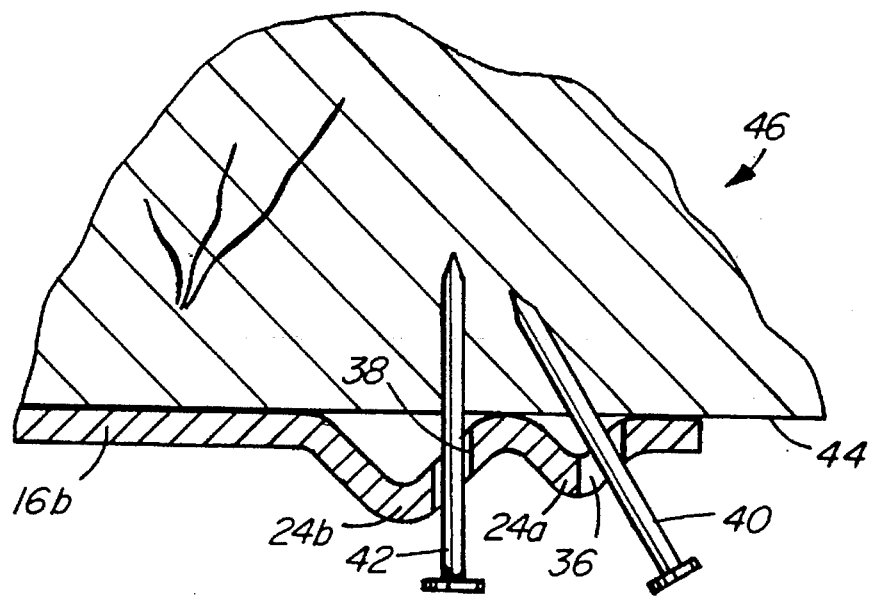
FIGS. 5 and 6 show broken-away enlarged views of marginal edge portions of side support members of the hanger as shown in FIG. 4.
Figure 6:
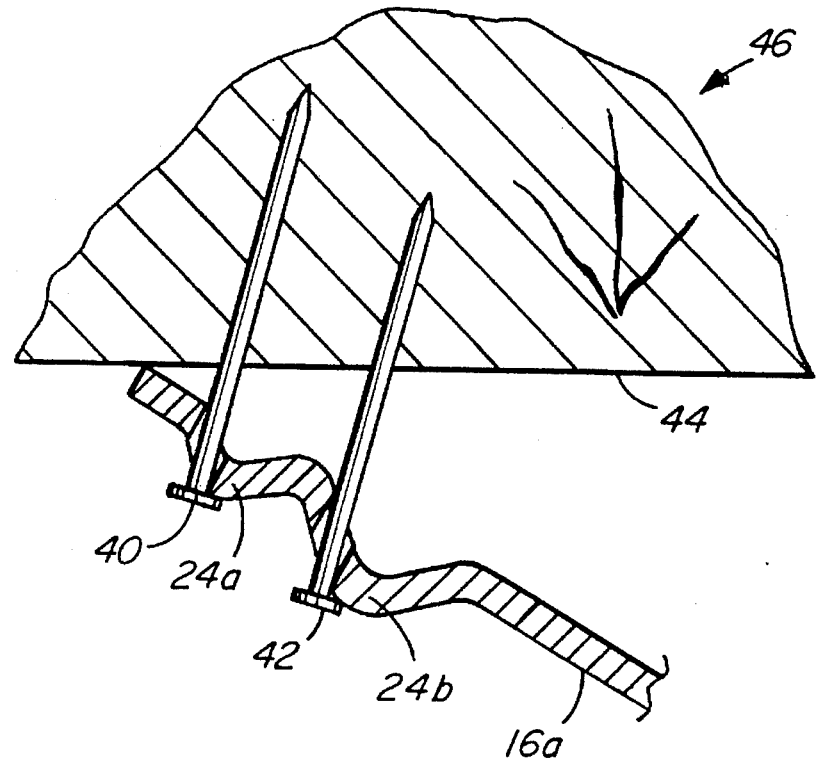

As can be seen from FIG. 5 and 6, the second ribs 24b are substantially larger than the first ribs 24a, so as to facilitate insertion of the nails 42 into the nail holes 38 at any angle without obstruction of the nails 42 by the first ribs 24a.

The tab member 32a is formed with nail holes 44, and the tab member 32b is formed with nail holes 46, and when the connector 10 is in use as shown in FIG. 2, nails 48 are driven through the nail holes 44 and 46 into opposite side faces of a second wood member indicated generally by reference numeral 50, which may for example be a rafter. As can be seen from FIG. 1, the nail holes 44 are horizontally offset from the nail holes 46 when the tab members 32a and 32b are bent at right angles relative to the backplate 12, so as to receive the end of the second wood member 50 between the tab members 32a and 32b. This avoids alignment of the nails 46 extending from the opposite sides of the second wood member 50 and, thereby, counteracts splitting of the second wood member by the nails 48.

The seat sides 28a and 28b are formed with nail holes 52 (FIG. 1), through which nails 54 (FIG. 2) can be driven into opposite sides of the second wood member 40.

As shown in FIG. 2, the second wood member 50 extends at right angles to the first wood member 46 and, consequently, the first and second side support member 16 and 16b are not bent relative to the backplate 12 but fit in surface-to-surface contact with the side face 44 of the first wood member 46.

Figure 4:
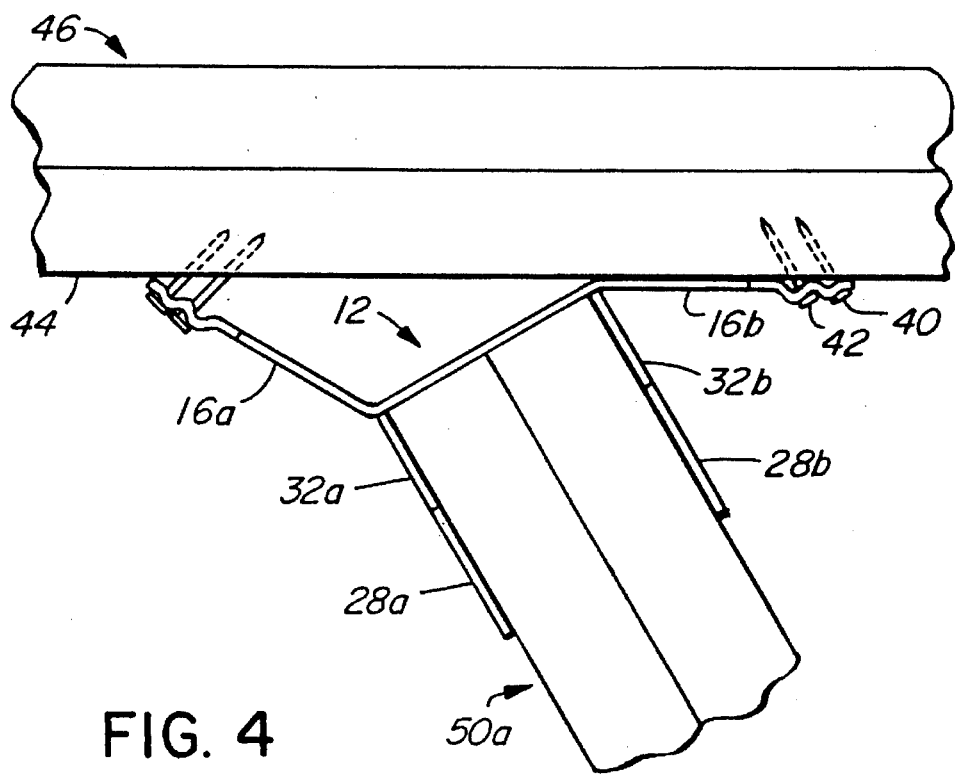
FIG. 4 shows a broken-away plan view of a pair of wood members connected to one another by the hanger of FIGS. 1 and 2, with the wood members skewed relative to one another.

FIG. 4 shows a different arrangement, in which a second wood member, which in this case is indicated generally by reference numeral 50a, is skewed relative to the first member 46. In this case, the first and second side support members 16a and 16b are bent relative to the backplate 12, so that the first side support member 16 and the backplate 12 each extend at an angle to the first wood member side face 44, while the second side support member 16b is in surface-to-surface contact with the side face 44.

To enable the connector 10 to be adapted to different angles of skew, the nail holes 36 and 38 in the ribs 24a and 24b are each dimensioned to receive a nail at an angle which is selectively variable, as is apparent from the different nail angles shown in FIGS. 5 and 6, so as to facilitate attachment of the respective side support member 16a or 16b to the first wood member 46 at a selectively variable angle.

As can be seen in FIG. 3, the marginal edge portions 22a and 22b have, at their opposite ends, end edges 56a, 58a and 56b, 58b, respectively, which are laterally outwardly convergently inclined, so as to be inclined relative to a top edge 60 of the connector 10 and bottom edges 62a and 62b of the first and second side support members 16a and 16b, respectively. This inclination of the end edges 56a, 58a, 56b and 58b enables the connector 10 to be installed on the first wood member 46 with the latter inclined and, for example, with the connector upper edge 60 horizontal, without corners of the connector 10 projecting beyond the top and bottom edges of the first wood member 46.

Figure 7:
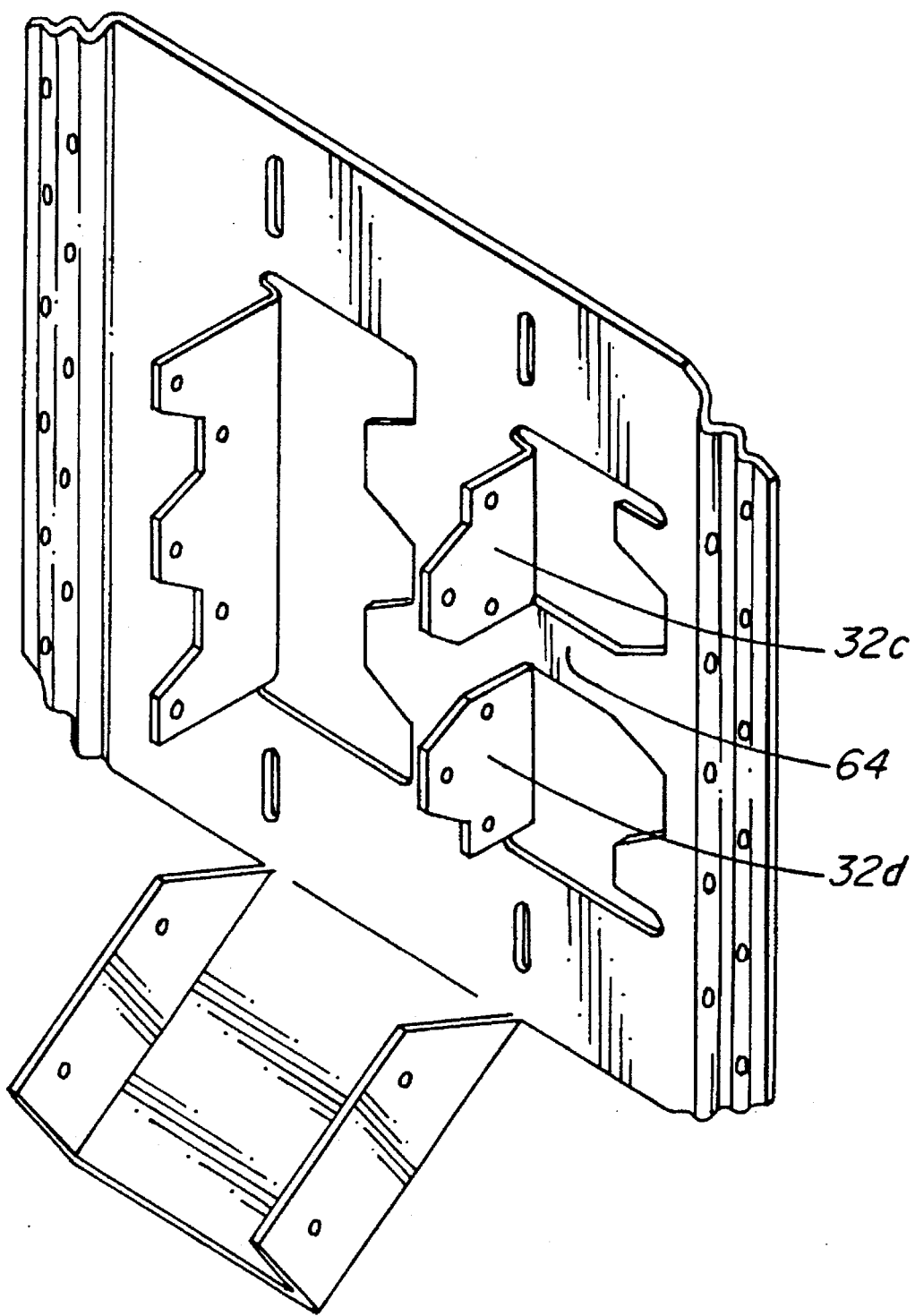
FIG. 7 shows a view similar to that of FIG. 1 but illustrating a modification of the hanger of FIGS. 1 through 6.

The above described hanger may be modified as shown in FIG. 7, in which a modified connector is indicated generally by reference numeral 10A.

The modified connector 10A is identical to the connector 10 of FIGS. 1 through 6 except that, in the case of the modified connector 10A the tab number 32b of the connector 10 is replaced by a pair of smaller tab members 32c and 32d, which are spaced vertically from one another, so as to leave a bridge portion 64 extending between and in one piece with the backplate edge portion 22b and the intermediate portion 20.

As will be apparent to those skilled in the art, various modifications may be made to the connectors 10 and 10A within the scope of the appended claims.

I claim:

1. A sheet metal slope and skew hanger connector for connecting a first wood member to a second wood member, said connector comprising:

a backplate;

first and second side support members located at opposite sides of said backplate and being bendable relative to said backplate;

each of said side support members being formed with a pair of parallel ribs extending along a marginal edge portion thereof and with a plurality of nail holes in each of said ribs to facilitate nailing of said connector to the first wood member;

said nail holes extending through said connector at laterally outermost sides of said ribs;

each of said pairs of ribs comprising a laterally outermost first rib and a laterally innermost second rib and said second rib being larger than said first rib to facilitate insertion of nails through said nail holes in said second rib without obstruction by said first rib;

a seat base extending from a bottom portion of said backplate and bendable relative to said backplate along said bottom portion for supportingly engaging an underside of the second wood member;

a pair of seat sides extending from opposite sides of said seat base and bendable along said opposite sides of said seat base;

nail holes in said seat sides to facilitate nailing of said seat sides to opposite side faces of the second wood member;

a pair of tab members spaced apart from one another with a portion of said backplate therebetween, said tab members being bendable relative to said backplate; and nail holes in said tab members to facilitate nailing of said tab members to the opposite side faces of the second wood member.

2. A sheet metal slope and skew hanger connector as claimed in claim 1, wherein said nail holes in said ribs are each dimensioned to receive a nail at an angle which is selectively variable to facilitate attachment of the respective side support member to said first wood member at a selectively variable angle.

3. A sheet metal slope and skew hanger connector as claimed in claim 1, wherein one of said tab members is integral with and bendable relative to an inner side of one of said side support members and wherein the other of said tab members is integral with and bendable relative to said backplate portion.

4. A sheet metal slope and skew hanger connector as claimed in claim 1, wherein said nail holes in said one of said tab members are located at positions which are different from the positions of the nail holes in the other of said tab members so as to avoid alignment of nails from opposite sides of the second wood member and, thereby, to counteract splitting of the second wood member.

5. A sheet metal slope and skew hanger connector as claimed in claim 1, wherein said support side members each have laterally outwardly convergent edges at opposite ends of said marginal edge portions.

6. A sheet metal slope and skew hanger connector as claimed in claim 1, wherein one of said tab members is one of a pair of spaced tab members at one side of said backplate portion.

* * * * *